US008511458B2

(12) United States Patent
Setozaki

(10) Patent No.: US 8,511,458 B2

(45) Date of Patent: Aug. 20, 2013

(54) METHOD AND APPARATUS FOR SUPPLYING BAGS TO A PACKAGING MACHINE

(75) Inventor: Masakazu Setozaki, Iwankuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 497 days.

(21) Appl. No.: 12/655,035

(22) Filed: Dec. 18, 2009

(65) Prior Publication Data

US 2010/0162664 A1 Jul. 1, 2010

(30) Foreign Application Priority Data

Dec. 26, 2008 (JP) ................................ 2008-331688

(51) Int. Cl.
*B65G 47/24* (2006.01)

(52) U.S. Cl.
USPC ......................... 198/407; 414/788.4; 493/267

(58) Field of Classification Search
USPC .................. 53/452, 542, 558, 443, 455, 562, 53/202, 393; 414/788.4, 788, 788.6, 789.2, 414/791.5, 795, 729, 737, 738, 744.1, 801, 414/785; 493/194, 196, 198, 199, 227, 267, 493/186, 29, 8; 198/400, 401, 406, 407, 198/409, 410, 377.04; 271/69
See application file for complete search history.

(56) References Cited

U.S. PATENT DOCUMENTS 4,726,170 A * 2/1988 Sawa et al. ...................... 53/570
5,288,284 A * 2/1994 Achelpohl et al. ............ 493/221
5,335,478 A * 8/1994 Aronsen ......................... 53/412
6,416,453 B1 * 7/2002 Simonetti et al. ............. 493/269
7,021,036 B2 * 4/2006 Hiramoto et al. ............... 53/562
7,581,370 B2 * 9/2009 Koga .............................. 53/455
7,937,916 B2 * 5/2011 Thierig et al. .................. 53/562

FOREIGN PATENT DOCUMENTS

JP H8-337217 12/1996
JP 3105568 9/2000
JP 2002-308223 10/2002
JP 2004-42447 2/2004
JP 2004-244085 9/2004
JP 2006-111346 4/2006
JP 3840255 8/2006

* cited by examiner

*Primary Examiner* — James Keenan
*Assistant Examiner* — Glenn Myers
(74) *Attorney, Agent, or Firm* — DLA Piper LLP (US)

(57) ABSTRACT

A bag-making and packaging machine including first through third transportation devices provided between a positioning conveyor that positions bags fed out from a horizontal-type bag-making machine and a supply conveyor that supplies the bags to a conveyor magazine-type bag-supply apparatus of a packaging machine, wherein the first transportation device suctions and raises the bags from the positioning conveyor and changes them into a vertical attitude with the bag mouth portions facing downward, the second transportation device takes the bags held by the first transportation devices by gripping them with the gripping members, horizontally transports them to a prescribed position while rotating them, and then the third transportation device suctions and takes up the bags from the second transportation device, changes them to a horizontal attitude with the bag mouth portions facing in the bag feed direction and then places them on the supply conveyor.

3 Claims, 9 Drawing Sheets

METHOD AND APPARATUS FOR SUPPLYING BAGS TO A PACKAGING MACHINE

BACKGROUND OF THE INVENTION

1. Field of the Invention

The present invention relates to, in a bag-making and packaging machine that includes both a horizontal-type bag-making machine and a packaging machine where the two work in tandem, a method and apparatus for sequentially supplying bags manufactured by the horizontal-type bag-making machine to a belt conveyor of a conveyor magazine-type bag-supply apparatus of the packaging machine without stocking bags temporarily.

2. Description of the Related Art

A horizontal-type bag-making machine winds off a belt-like film from a film roll provided horizontally, folds and overlays the belt-like film as the film is being fed in its longitudinal direction, seals the portions that will become the bag bottom and bag sides with a sealing device while intermittently feeding the film lying flat longitudinally within a horizontal plane, thus creating connected bags, and then the machine cuts off individual bags from the front end of the connected bags. Horizontal-type bag-making machines come in a one-row type as disclosed in, for example, Japanese Patent Application Laid-Open (Kokai) Nos. 2004-42447, 2004-244085 and 2006-111346 (FIG. 8) (that makes one row of connected bags to feed out one bag) and a two-row type as disclosed in, for instance, Japanese Patent Nos. 3840255 and 3105568 (that makes two rows of connected bags to feed out two bags in parallel).

A packaging machine includes those that include two bag-supply apparatus (as described in Japanese Patent Application Laid-Open (Kokai) Nos. 2004-42447 and 2004-244085), those that includes one bag-supply apparatus (as described in Japanese Patent Application Laid-Open (Kokai) No. 2006-111346 (FIG. 8) and Japanese Patent No. 3105568), and those that includes four bag-supply apparatus (as described in Japanese Patent Application Laid-Open (Kokai) No. 2002-308223). Packaging machines receive one bag each from one or a plurality of bag-supply apparatus (if a plurality of bag-supply apparatus are provided, a plurality of bags are received simultaneously) and simultaneously apply packaging processes to the bags.

Further, in the bag-making and packaging machine described in Japanese Patent Application Laid-Open (Kokai) Nos. 2004-42447, 2004-244085 and 2006-111346 (FIG. 8), the orientation of the bags (the direction the bag mouth portion faces) manufactured by the bag-making machine is designed so as to match the orientation of the bags of the bag-supply apparatus of the packaging machine. Accordingly, the bags manufactured by the bag-making machine are fed to the bag-supply apparatus of the packaging machine "as is", without changing the orientation.

Generally, in a bag-making and packaging machine, it is usual to install the bag-making machine and the packaging machine so that the orientation of the bags manufactured by the bag-making machine matches the orientation of the bags in the bag-supply apparatus of the packaging machine. However, in certain situations, the layout of factory does not allow matching of the orientations of these machines. Further, horizontal-type bag-making machines with high processing capability are generally two-row or 2×two-row (four-row) systems. In these horizontal-type bag-making machines, the orientation of the manufactured bags differs as described in Japanese Patent No. 3840255 (in which the bag mouth portions face toward each other). Such cases require a means that changes the bag orientation between the bag-making machine and the bag-supply apparatus of the packaging machine.

Just like there are one-row type, two-row type, four-row type and other systems in bag-making machines, packaging machines include either one or a plurality of bag-supply apparatuses. When a bag-making machine and a packaging machine of such types are combined to form a bag-making and packaging machine in which the two machines operate in tandem (matching the number of bags made by the bag-making machine to the number of bags processed by the packaging machine), it can naturally occur that the number of rows of bags fed out from the bag-making machine differs from the number of bag-supply apparatus of the packaging machine. In such cases, a means that supplies bags evenly to all bag-supply apparatuses and makes up for the difference in the number of rows and number of units between the bag-making machines and bag-supply apparatus is required.

Japanese Patent Application Laid-Open (Kokai) Nos. 2004-42447 and 2004-244085 disclose a bag-supplying and packaging machine in which a one-row bag-making machine and a packaging machine that has two bag-supply apparatus are combined. Neither, however, disclose what to do when the orientation of the bags manufactured by the bag-making machine differs from the orientation of the bags in the bag-supply apparatus of the packaging machine or what to do when the bag-making machine is a two-row type.

Further, Japanese Patent No. 3105568 discloses a bag-making and packaging machine in which a two-row bag-making machine and a packaging machine that has one bag-supply apparatus are combined. The invention therein is, however, limited to a means that changes two rows into one row, and it assumes that the orientation of the bags manufactured by the bag-making machine matches the orientation of the bags in the bag-supply apparatus of the packaging machine; and furthermore it is a type that stacks the bags and stocks them as bundles, and there is no consideration given to an application to a conveyor magazine-type bag-supply apparatus.

BRIEF SUMMARY OF THE INVENTION

The object of the present invention is to provide a method and apparatus used in a bag-making and packaging machine that includes both a horizontal-type bag-making machine and a packaging machine that operate in tandem and more particularly to provide a method and apparatus used in a bag-making and packaging machine in which bags made by the horizontal-type bag-making machine are supplied sequentially therefrom to the belt conveyor of a conveyor magazine-type bag-supply apparatus of the packaging machine without temporarily stocking the bags; and this supply of bags is, in the present invention, performed without regard to whether the orientation of the bags manufactured by the bag-making machine is different from or the same as the orientation of the bags in the bag-supply apparatus of the packaging machine and also without regard to the number of rows of bags fed out from the bag-making machine.

The above object is accomplished by unique steps of the present invention for a method of supplying bags to a packaging machine, and the method of the present invention comprises the steps of:

creating, in a horizontal-type bag-making machine, connected bags joined in belt-like fashion as a belt-like film is fed sequentially in a longitudinal direction of the belt-like film and then cutting off individual bags from the connected bags, placing bags fed out from the horizontal-type bag-making machine onto a positioning conveyor and conveying the bags while positioning the bags at a prescribed location on the positioning conveyor, moving the positioned bags upward, changing the bags into a vertical attitude in which bag mouth portions of the bags face downward, transporting the bags horizontally toward a prescribed location, while maintaining the vertical attitude thereof, and rotating the bags, then changing the vertically-oriented bags to a horizontal attitude, and placing the bags on a supply conveyor, and conveying and supplying the bags on the supply conveyor toward a belt conveyor of a conveyor magazine-type bag-supply apparatus of the packaging machine.

In one example of a specific embodiment of the present invention, a plurality of bags are positioned on the positioning conveyor at a space distance $P_0$ in the conveyance direction of the positioning conveyor; and when a plurality of the supply conveyors are installed in parallel at a space distance of P, which is greater than the space distance $P_0$, then the space between each of the bags is increased from $P_0$ to P in any one of the plurality of processes between the process that moves the bags positioned on the positioning conveyor upward and the process that places the bags on the supply conveyor. In this case, it is desirable that the space between the bags is increased from $P_0$ to P during the process that moves the bags positioned on the positioning conveyor upward.

Furthermore, the above object is accomplished by a unique structure of the present invention for an apparatus for supplying bags to a packaging machine, and the apparatus of the present invention comprises:

a positioning conveyor that conveys bags fed out from a horizontal-type bag-making machine and positions the bags at a prescribed location, the horizontal-type bag-making machine creating connected bags joined in belt-like fashion as a belt-like film is fed sequentially in a longitudinal direction of the belt-like film and then cutting off individual bags from the connected bags, a supply conveyor that conveys and sequentially supplies the bags manufactured by the horizontal-type bag-making machine toward a belt conveyor of a conveyor magazine-type bag-supply apparatus of the packaging machine, and transportation means that comprise first through third transportation means provided between the positioning conveyor and the supply conveyor, wherein the first transportation means is comprised of swing arms that swing up and down within a perpendicular plane and suction members that are provided on the swing arms so as to suction bag surfaces of the bags, the first transportation means suctioning the bags positioned on the positioning conveyor, moving the bags upward, and then changing the bags to a vertical attitude in which bag mouth portions of the bags face down, the second transportation means is comprised of transportation arms that swing within a horizontal plane, supporting members provided on the transportation arms so as to rotate in the horizontal plane, bag gripping members provided on the supporting members and open and close, the second transportation means gripping and taking the bags held in the vertical attitude by the suction members of the first transportation means, transporting the bags toward a prescribed location while keeping the bags in the vertical attitude, and rotating the bags such that bag surfaces of the bags face a feed direction of the supply conveyor, and the third transportation means is comprised of a swing arm that swings up and down within a perpendicular plane and suction members provided on the swing arm to suction bag surfaces of the bags, the third transportation means suctioning and taking the bags held in the vertical attitude by the bag gripping members of the second transportation means, changing the bags to a horizontal attitude, and placing the bags on the supply conveyor such that the bag mouth portions of the bags face the feed direction of the supply conveyor.

In an example of a specific embodiment of the present invention, the above-described horizontal-type bag-making machine creates A rows (A: 1 or 2) of connected bags and then cuts off individual bags from the connected bags, B (B: 1 or an integer 2 or greater) bags are positioned on the positioning conveyor in a conveyance direction of the positioning conveyor for each row of the bags fed out from the horizontal-type bag-making machine, A×B conveyor magazine-type bag-supply apparatuses are installed, the supply conveyor is provided for each belt conveyor of the conveyor magazine-type bag-supply apparatus, A set of the first and second transportation means are provided so as to correspond to the rows of the bags fed out from the horizontal-type bag-making machine, the suction members are provided on the swing arms of the first transportation means so as to correspond to B bags positioned on the positioning conveyor in the conveyance direction, the bag gripping members are provided on the supporting members of the second transportation means so as to correspond to B bags suctioned by the suction members of the first transportation means, and the suction members are provided on the swing arms of the third transportation means so as to correspond to A×B bags held by the bag-gripping member.

In another example of a specific embodiment of the present invention, when the above-described B is an integer 2 or greater, then the space distance between the bags for each row positioned on the positioning conveyor is set to $P_0$ and the space distance between a plurality of supply conveyors installed in parallel is set to P ($P>P_0$), any one or a plurality of spaces, which are the space between the suction members of the first transportation means, the between the bag gripping members of the second transportation means, and the space between the suction members of the third transportation means, are widened as the bags are transported, so that the space distance between the bags placed on the supply conveyors becomes P.

In this setting, it is preferable that the space distance between the suction members of the first transportation means be widened from $P_0$ to P during the transportation thereby, and the space distances between the bag gripping members of the second transportation means and between the suction members of the third transportation means be fixed to P. The suction members of the first transportation means must be set such that the space between the suction members is $P_0$ when the suctioning members suction the bags positioned on the positioning conveyor, and the suction members of the third transportation means must be set such that the space between the suction members is P when the suction members places the bags on the supply conveyor.

It is also preferable that when the above-described B be an integer 2 or greater, then the positioning conveyor of the first transportation means comprise B sub-conveyors installed in series in a conveyance direction thereof, and one bag from each one of rows of the bags be positioned on each sub-conveyor.

As seen from the above, according to the present invention, in a bag-making and packaging machine in which bags manufactured by a horizontal-type bag-making machine is supplied sequentially to the belt conveyor of a conveyor magazine-type bag-supply apparatus of a packaging machine without temporarily stocking the bags, the bag-making and packaging machine can be formed by a horizontal-type bag-making machine and a packaging machine without regard to whether the orientation of the bags manufactured by the bag-making machine is different from or the same as the orientation of the bags in the bag-supply apparatus of the packaging machine and without regard to the number of rows of the bags fed out from the bag-making machine. According to the present invention, bags are supplied to a packaging machine with high efficiency without lowering the production capabilities of either the horizontal-type bag-making machine or the packaging machine. Furthermore, the present invention has such advantage that the mechanisms for changing the bag orientation and adjusting the number of rows is simple.

Also, when a plurality (B≧2) of bags are positioned on the positioning conveyor in the conveyance direction of the positioning conveyor, the space between the bags for each row positioned on the positioning conveyor is set to $P_0$, and the space between a plurality of parallel supply conveyors is set to P ($P>P_0$), then the conveyance distance of the bags on the positioning conveyor is smaller than when $P_0$ is set equal to P (a wide space between bags at the time of positioning); as a result, the time spent for positioning the bags is shortened and the bag supply speed is enhanced.

The present invention can be applied not only when the number of rows of bags manufactured by the horizontal-type bag-making machine is fewer than the number of conveyor magazines of the packaging machine but also when that number of rows of bags manufactured by the horizontal-type bag-making machine is the same or greater than the number of conveyor magazines of the packaging machine.

DETAILED DESCRIPTION OF THE INVENTION

The method and apparatus of supplying bags to a packaging machine according to the present invention will be described in detail below with reference to FIGS. 1 through 9.

Figure 1:
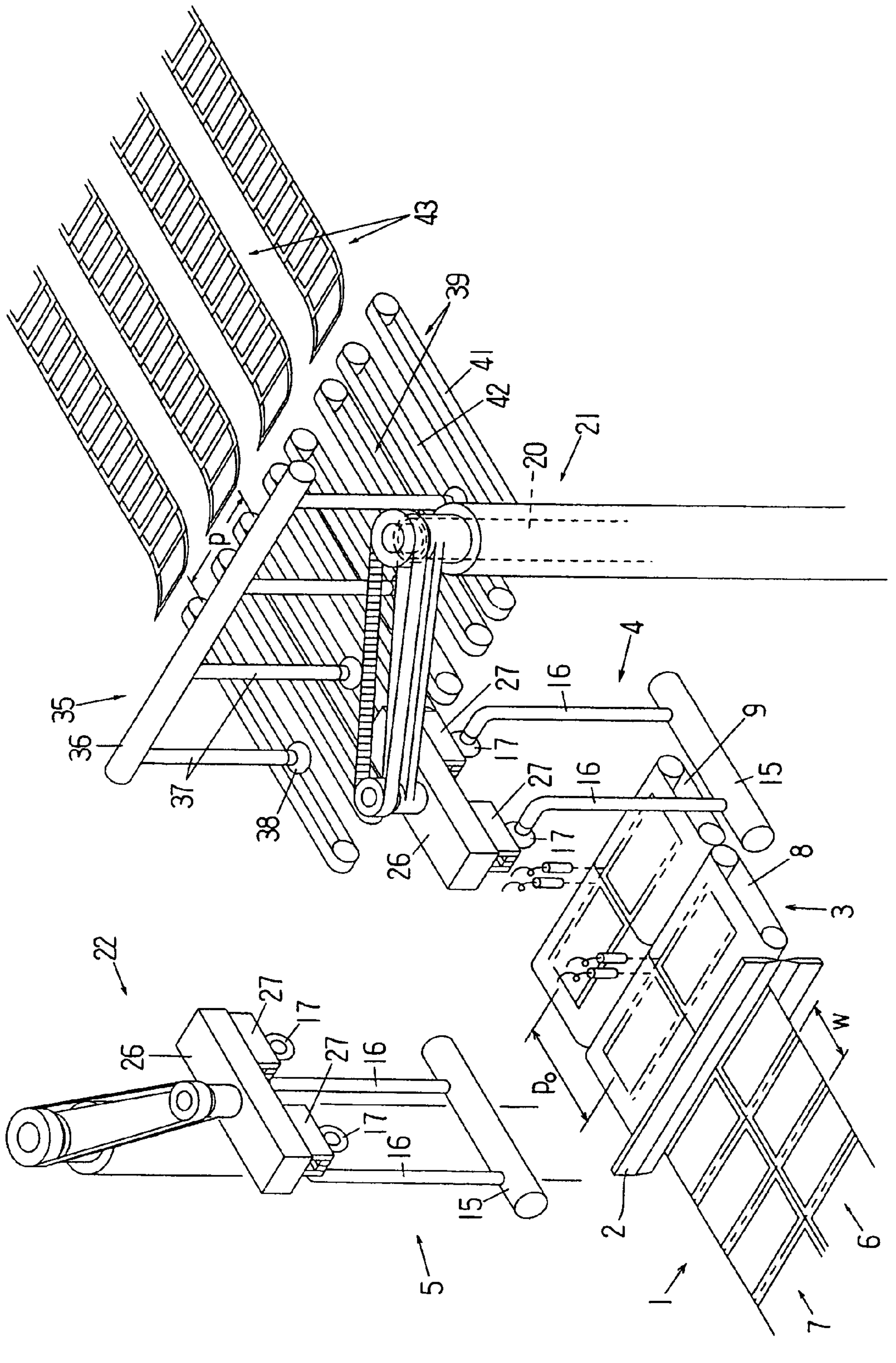
FIG. 1 is an overall perspective view of a bag supply apparatus according to the present invention.

FIG. 1 is an overall perspective view of the apparatus for supplying bags to a packaging machine.

In the example shown in FIG. 1, a horizontal-type bag-making machine (only the cutter is shown) creates two rows of connected bags in which adjacent bags are joined at their respective side edges and two bags are fed out therefrom in parallel in the direction of the width of the bags (the horizontal-type bag-making machine being a two-row type). The bag mouth portions of the two simultaneously-fed bags face in the direction opposite to each other (facing outwardly). This type of horizontal-type bag-making machine is known and is described in, for example, Japanese Patent No. 3840255 (wherein, however, the bag mouth portions face the same direction.) The packaging machine (not shown in the drawings, and as seen from the following description, only the groups of bags placed on the belt conveyor of a conveyor magazine-type bag-supply apparatus are illustrated) includes four conveyor magazine-type bag-supply apparatuses, and it takes up four bags at once and applies various types of package processing. This type of packaging machine is known as disclosed in, for example, Japanese Patent Application Laid-Open (Kokai) No. 2002-308223.

The horizontal-type bag-making machine and the packaging machine are installed such that the conveyance direction (left to right in the drawings) of the belt conveyors of the conveyor magazine-type bag-supply apparatuses matches the bag feed direction of the horizontal-type bag-making machine.

As can be seen from the above and from FIG. 1, the orientation of the bags manufactured by and fed out from the horizontal-type bag-making machine differs by 90 degrees from the orientation of the bags in the conveyor magazine-type bag-supply apparatuses (the orientation of bags to be supplied to the belt conveyors of the conveyor magazine-type bag-supply apparatuses), and the orientation of the bags fed out in parallel from the horizontal-type bag-making machine differs from each other by 180 degrees. In the shown example, the number of bags fed out from the horizontal-type bag-making machine at once is two, and the number of belt conveyors of the conveyor magazine-type bag-supply apparatuses is four (meaning four bags are supplied to the packaging machine at once).

The components that constitute the bag supply apparatus according to the present invention will be further described below in detail with reference to FIGS. 2 through 8.

Figure 2:
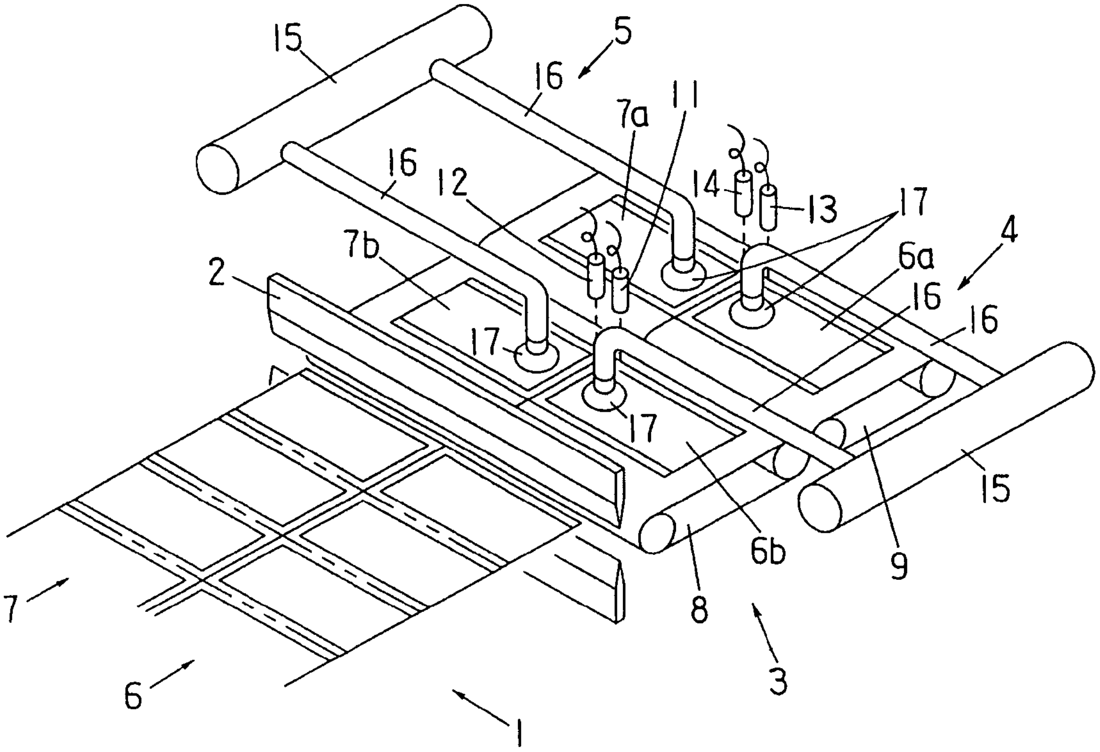
FIG. 2 is a diagram illustrating the action of the method and apparatus of the present invention, particularly showing the first transportation means with the suction members suctioning the bags.

FIG. 2 shows part of the horizontal-type bag-making machine 1 (only cutter 2 thereof is shown), positioning conveyor 3 and the first transportation means 4 and 5.

In the horizontal-type bag-making machine 1, two rows of connected bags 6 and 7 joined in belt-like fashion with portions corresponding to the bag bottoms and bag sides sealed (at this point, the connected bags 6 and the connected bags 7 are separated from each other) are created while being intermittently transported forward (rightward in FIG. 1); and at each intermittent stop, one bag in each row is cut off and separated from the leading ends of the respective connected bags 6 and 7 by upper and lower cutters 2 which are moved up and down to come into contact and separate from each other. Connected bags 6 and 7 are, at this point as described above, separated from each other in the longitudinal direction in the center of the film, and the bag mouth portions of the bags that respectively form the connected bags 6 and 7 face in the opposite directions (or they face outwardly).

Positioning conveyor 3, which positions, as seen from FIG. 2, bags 6*a*, 7*a*, 6*b* and 7*b* separated from the respective connected bags 6 and 7, is provided ahead (or on the downstream side) of the cutter 2. The positioning conveyor 3 is comprised of two small conveyors (or two sub-conveyors comprising a first conveyor 8 and a second conveyor 9) that are installed in series to each other and with the conveyance direction in parallel to (or the same as) the direction of transportation of the connected bags 6 and 7 in the horizontal-type bag-making machine 1. The first and second conveyors 8 and 9 are equipped with drive mechanisms (not shown) that are independent of each other; and they start to operate immediately after the action of the cutter 2 (for separating the respective bags) and then stop based on the detection signals from first detection sensors 11 and 12 and second detection sensors 13 and 14. The first and second conveyors 8 and 9 are set up so that they operate once in every two actions of the cutter 2.

One example of the processes up to the point where the bags separated from the connected bags 6 and 7, with two bags from each row (bags 6*a*, 7*a*, 6*b* and 7*b*) as shown in FIG. 2, are positioned on the belts of the first and second conveyors 8 and 9 will be described next.

First, the bags 6*a* and 7*a*, which have arrived on the belt of the first conveyor 8 and stopped there are cut off from the connected bags 6 and 7 by the cutter 2 (see FIG. 3), and then the first and second conveyors 8 and 9 are operated so that the separated bags 6*a* and 7*a* are conveyed forward. During this operation, the connected bags 6 and 7 start to move forward (toward the positioning conveyor 3), then stop, so that the next bags 6*b* and 7*b* are cut off from the connected bags 6 and 7 by the cutter 2 (see FIG. 4). While the first conveyor 8 is conveying the bags 6*b* and 7*b* and the second conveyor 9 is conveying the bags 6*a* and 7*a*, the first detection sensors 11 and 12 detect the bags 6*b* and 7*b*, and the second detection sensors 13 and 14 detect the bags 6*a* and 7*a*. The first and second conveyors 8 and 9 stop when they receive the detection signals, so that the bags 6*b* and 7*b* are positioned at a prescribed location on the belt of the first conveyor 8, and the bags 6*a* and 7*a* are positioned at a prescribed location on the belt of the second conveyor 9. As seen from FIG. 1, the space (distance between centers) $P_0$ between the positioned rows of the separated bags (bags 6*a* and 6*b*, bags 7*a* and 7*b*) on the positioning conveyor 3 (comprising the first and second conveyors 8 and 9) is set to be larger than the bag width W and to be the same as the space P between the adjacent supply conveyors 39 (or as the distance between centers of the adjacent supply conveyors 39), which are installed in parallel and will be described later.

In this example, since the number of bags positioned at one time is 2 rows×2 bags, the positioning conveyor 3 is formed by two small conveyors (first and second conveyors (sub-conveyors) 8 and 9, each slightly larger than the size of one bag). If the number of bags set thereon is generally 2 rows×B (B: integer of 1 or 2 or greater), then the positioning conveyor 3 is comprised of B small conveyors (or sub-conveyors). So as to ensure the positioning precision of the bags (particularly, the space between the bags 6*a* and 7*a* cut first and the bags 6*b* and 7*b* cut next), it is desirable that the positioning conveyor 3 be formed by B small conveyors that respectively have independent drive mechanisms, and it is nonetheless possible that the positioning conveyor 3 is formed by only one conveyor. In addition, instead of controlling the stop of the first and second conveyors 8 and 9 by the first and second detection sensors 11 through 14 (for bag positioning control purposes), a stopper(s) that positions the bags by stopping them on the positioning conveyor can be used.

First transportation means 4 and 5 are installed at symmetrical positions on either side of the first and second conveyors 8 and 9.

More specifically, the first transportation means 4 and 5 have the same construction, and each one of them is, as best shown in FIG. 2, comprised of a rotation shaft 15 disposed parallel to the conveyance direction of the first and second conveyors 8 and 9, one pair of swing arms 16 fixed to the rotational shaft 15 so as to be vertical thereto, and suction members 17 installed at the curved tip ends of the swing arms 16. The suction members 17 are connected to a vacuum source or atmosphere, through switching valves (not shown), from the tubular swing arms 16. The rotation shaft 15 is powered by a drive source (not shown) so as to be able to rotate back and forth 90 degrees between the horizontal position and the vertical position. More specifically, as the rotation shafts 15 rotates, the swing arms 16 swing up and down in the vertical plane perpendicular to the direction of width of bags 6*a*, 6*b*, 7*a* and 7*b* (the feed direction of the connected bags 6 and 7) between the horizontal position shown in FIG. 2 and the perpendicular position shown in FIG. 3. The space between suction members 17 and 17 provided at the tip ends of the tubular swing arms 16 of each first transportation means 4 and 5 (distance between centers) is set to a space P (=$P_0$) that is the distance between the supply conveyors 39 which are installed in parallel.

Figure 3:
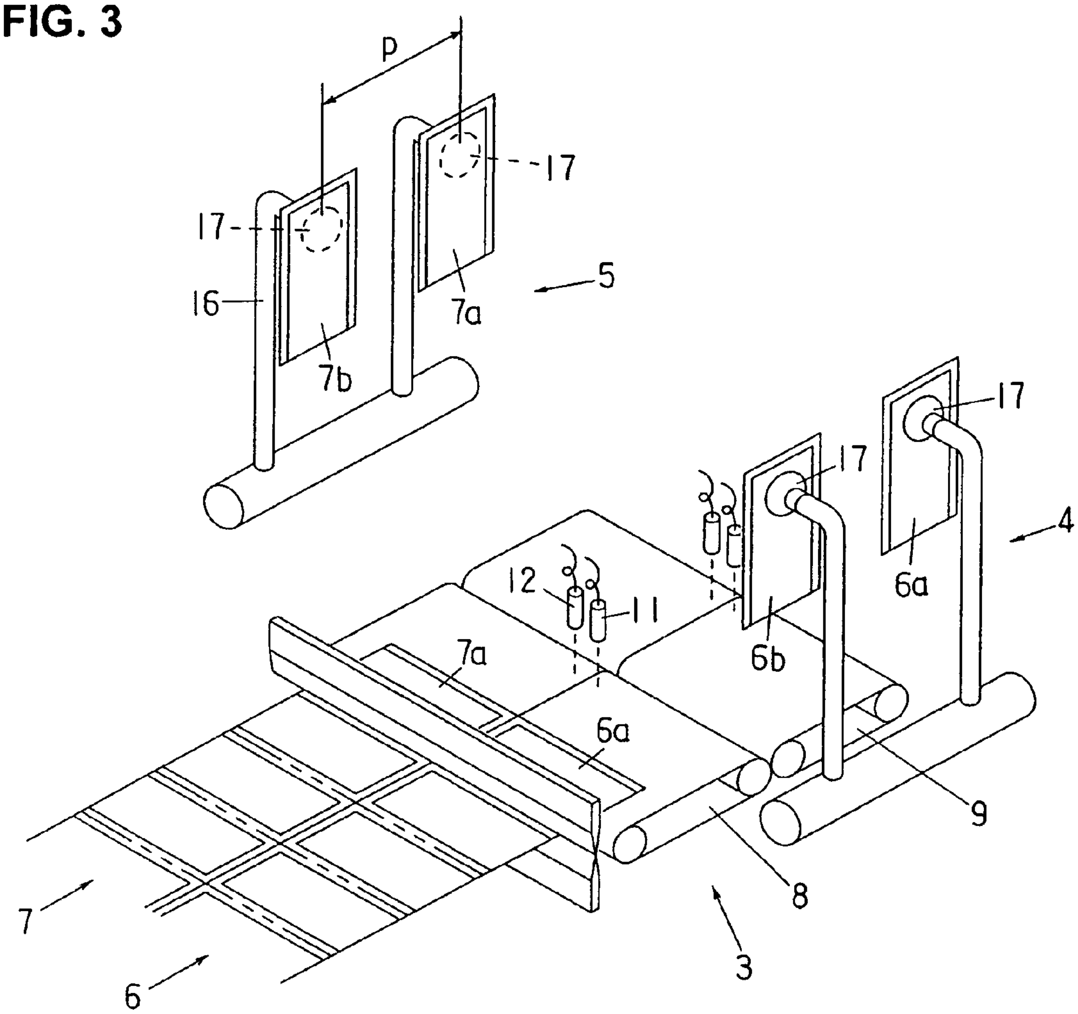
FIG. 3 is a diagram illustrating the action of the method and apparatus of the present invention, particularly showing the first transportation means with the swing arms move the bags into vertical attitude.

When, as shown in FIG. 2, the swing arms 16 and 16 swing down (both moving to face inward) to the horizontal position, the suction surfaces of the suction members 17 face downward, and the bags 6*a*, 6*b*, 7*a* and 7*b* positioned on the first and second conveyors 8 and 9 are pressed at their closed sides (near bag bottoms) and suctioned by the suction members 17. Then, as shown in FIG. 3, the swing arms 16 swing from this position to the perpendicular position, and the bags 6*a*, 6*b*, 7*a* and 7*b* are moved upward along a plane that is perpendicular to the bag surfaces. The bags are, as a result, changed from the horizontal attitude to the perpendicular attitude with the bag mouth portions facing down (the suction surfaces of the suction members 17 face the horizontal direction). At this time, the bag surfaces of bags 6*a*, 6*b*, 7*a* and 7*b* are within the plane parallel to the feed direction of the connected bags 6 and 7 (that matches the conveyance direction of the positioning conveyor 3), and the bag surfaces of the bags 6*a* and 6*b* face the bag surfaces of the bags 7*a* and 7*b*. As seen from the above description and from FIGS. 2 and 3, the first transportation means 4 and 5 function symmetrically to each other.

Furthermore, as seen from FIG. 1, second transportation means 21 and 22 are installed at symmetrical positions near the first transportation means 4 and 5.

Figure 4:
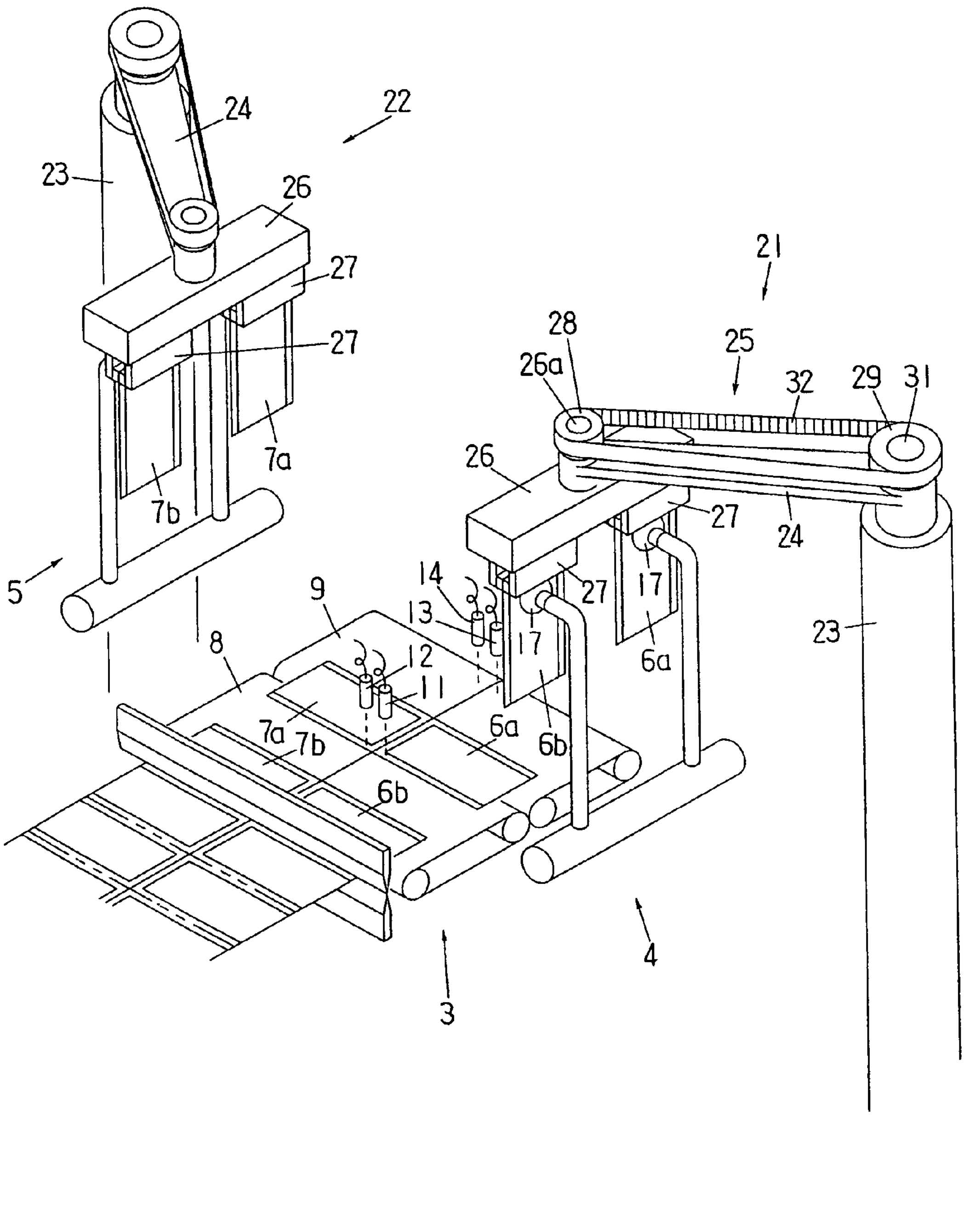
FIG. 4 is a diagram illustrating the action of the method and apparatus of the present invention, particularly showing the second transportation means with the bag gripping members gripping the bags from the fist transportation means.

The second transportation means 21 and 22 have the same construction, and, as seen from FIG. 4, each one of the second transportation means 21 and 22 comprises a perpendicularly standing hollow support pillar 23, a hollow base shaft 20 which is rotatably provided in the support pillar 23 and rotate back and forth within a prescribed angle by being driven by a drive source (not shown) within a horizontal plane (see FIG. 1). Each one of the second transportation means 21 and 22 further includes a transportation arm 24, which is fixed to the base shaft 20 so as to swing back and forth within a prescribed angle within the horizontal plane by the rotation of the base shaft 20, a support shaft 26*a* which is provided in the tip end of the transportation arm 24 so as to be rotatble within a horizontal plane. The support shaft 26*a* is provided with a supporting member 26 which is horizontally rotatable back and forth within a prescribed angle by a drive mechanism 25, and a pair of bag gripping members 27 are installed on the underneath of the supporting member 26. The drive mechanism 25 is comprised of a first pulley 28 fixed to the support shaft 26*a*, a second pulley 31 fixed to the rotation shaft 29 that is rotatably provided within the base shaft 20, a timing belt 32 provided between the two (first and second) pulleys 28 and 31, and a drive source (not shown) that drives (rotates) the rotation shaft 29 within a prescribed angle. The space between the bag gripping members 27 and 27 (the distance between their centers) provided on the supporting member 26 of the second transportation means 21 and 22 is set to P (=$P_0$).

The support shaft 26*a* is disposed at the center of the supporting member 26, and a pair of bag gripping members 27, which are for gripping the top edges (closed sides or bag bottoms) of the bags, whose bag mouth portion faces downward, from both sides, are installed on the underside of the supporting member 26 so that the bag gripping members 27 are on the left and right sides of the supporting member 26 with the support shaft 26*a* at the center. The bag gripping members 27 are opened and closed by a drive mechanism (not shown) and grip the bags when closed.

The supporting members 26 are moved in the horizontal plane between a first position (see FIG. 4) which is on the first transportation means 4 and 5 side and a second position (see FIG. 5) which is on the third transportation means 35 (described below) side when the transportation arms 24 swing; and during this movement from the first position to the second position, they are respectively rotated about the support shafts 26*a* a prescribed angle with respect to the transportation arm 24.

The transportation arms 24 and 24 and supporting members 26 and 26 of the second transportation means 21 and 22 are moved symmetrically to their counterpart.

As shown in FIG. 4, when the respective supporting members 26 and 26 of the second transportation means 21 and 22 arrive at the position (first position) which is on the first transportation means 4 and 5 side, the bag gripping members 27 and 27 on the supporting members 26 of one of the second transportation means 21 are located directly above the bags 6*a* and 6*b*, which are held vertically by the first transportation means 4, and close there to grip the bags 6*a* and 6*b*, while the bag gripping members 27 and 27 on the supporting member 26 of the other second transportation means 22 are located directly above the bags 7*a* and 7*b*, which are held vertically by the first transportation means 5, and close there to grip the bags 7*a* and 7*b*. The bag surfaces of the bags 6*a*, 6*b*, 7*a* and 7*b*, which are held vertically by the first transportation means 4 and 5, are in a plane parallel to the conveyance direction of the positioning conveyor 3, and the gripping surfaces of the bag gripping members 27 and 27 of the supporting members 26 and 26 of the second transportation means 21 and 22 are also in a plane parallel to the conveyance direction of the positioning conveyor 3.

Figure 5:
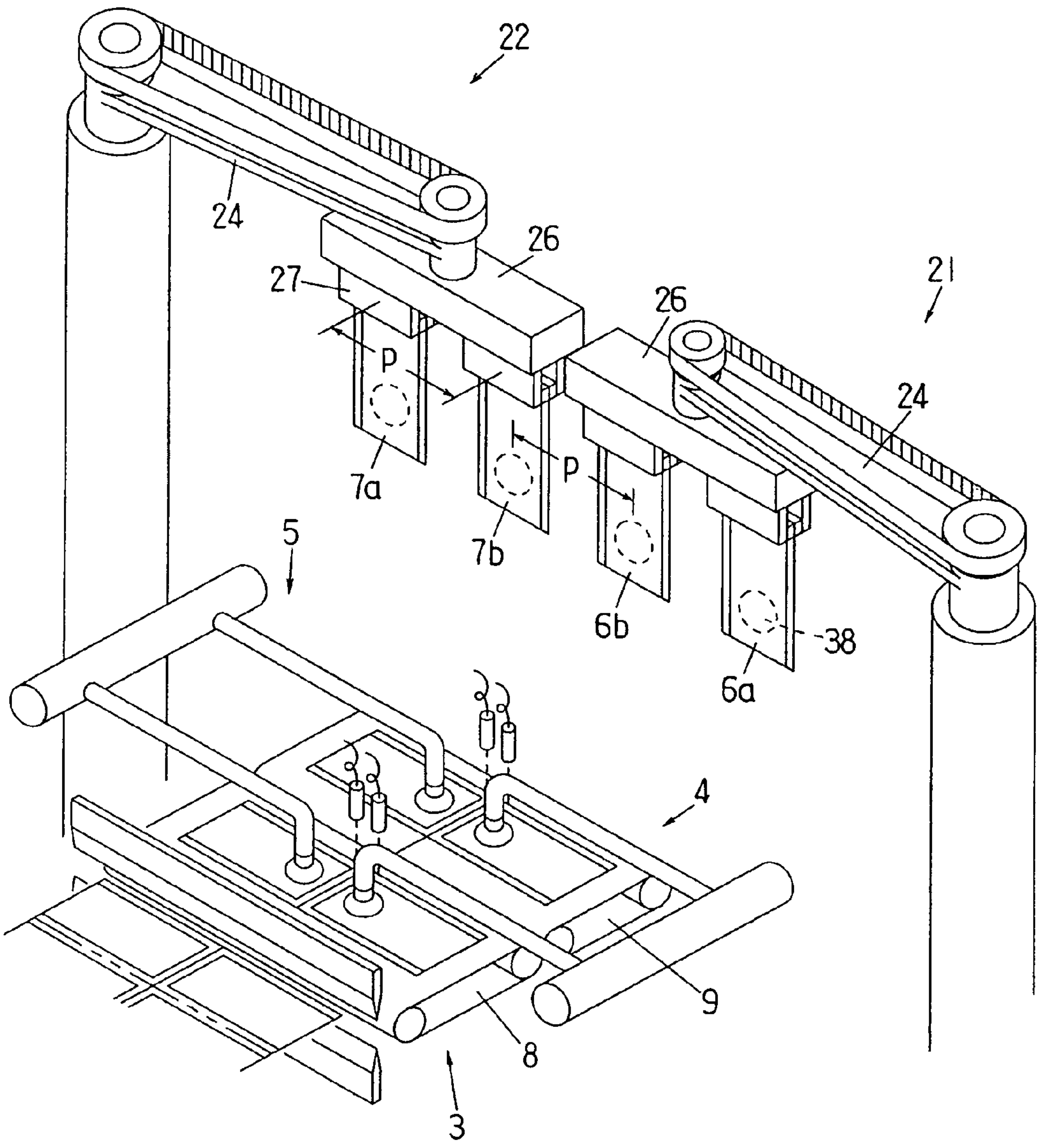
FIG. 5 is a diagram illustrating the action of the method and apparatus of the present invention, particularly showing the second transportation means with the bag gripping members rotated changing the facing direction of the bags.

As shown in FIG. 5, when the respective supporting members 26 and 26 of the second transportation means 21 and 22 arrive at the position (second position) on the third transportation means 35 side, the bag surface orientations of the bags 6*a*, 6*b*, 7*a* and 7*b*, which are gripped by the respective gripping members 27, are changed 90 degrees in the vertical direction with respect to the conveyance direction of the positioning conveyor 3, the bag surfaces face in the feed direction of the supply conveyors 39, which will be described below, and their rows are aligned in the direction of the bag width while the space between the bags is kept constant at P.

The space P (=$P_0$) between the bags 6*a* and 6*b* and the space P (=$P_0$) between the bags 7*a* and 7*b* gripped by the gripping members 27 of the second transportation means 21 and 22 has not been changed after the bags were positioned on the positioning conveyor 3. Accordingly, in the second transportation means 21 and 22, the swing angles of the respective transportation arms 24 and the positional relationship between the swing centers of the transportation arms 24 and the first transportation means 4 and 5 are set such that the space between the bags 6*b* and 7*b* when the bags 6*a*, 6*b*, 7*a* and 7*b* are aligned in one row in the direction of the bag width as shown in FIG. 5 is the same as the space between bags 6*a* and 6*b* and the space between bags 7*a* and 7*b* (all the spaces being P).

While the transportation arms 24 swing and the supporting members 26 are being moved from the position on the first transportation means 4 and 5 side (first position) to the position on the third transportation means 35 side (second position), the bags 6*a*, 6*b*, 7*a* and 7*b* are, as described above, rotated 90 degrees within the horizontal plane; however, since the supporting members 26 are rotated prescribed angles with respect to the transportation arms 24 when the transportation arms 24 swing, the angles of the swing of the transportation arms 24 can be set to considerably less than 90 degrees (if the supporting members 26 are installed so as not to be rotated with respect to the transportation arms 24, then the swing angles of the transportation arms 24 must be set to 90 degrees to make the bags 6*a*, 6*b*, 7*a* and 7*b* rotate 90 degrees). With this construction that reduces the swing angles of the transportation arms 24, the space required for the second transportation means 21 and 22 can be decreased, and the degree of freedom in designing the conditions that the space between bags 6*b* and 7*b* is set to be equal to the space between bags 6*a* and 6*b* and to the space between bags 7*a* and 7*b* increases.

Furthermore, in the shown example, while the supporting members 26 and 26 of the second transportation means 21 and 22 are being moved from the position on the first transportation means 4 and 5 side to the position on the third transportation means 35 side (or from the first position in FIG. 4 to the second position in FIG. 5), the supporting member 26 of the second transportation means 21 is rotated to the right (clockwise) and the supporting member 26 of the second transportation means 22 is rotated the left (anticlockwise); accordingly, when the supporting members 26 and 26 are brought to the position on the third transportation means 35 side (or to the second position) shown in FIG. 5, the bag surfaces of the bags 6*a*, 6*b*, 7*a* and 7*b* that were facing upward (the bag surfaces that faced upward when the bags were on the positioning conveyor 3) face backward with respect to the conveyance direction of the positioning conveyor 3 (or face left side in FIG. 5). In the present invention, it can be set so that the supporting member 26 of the second transportation means 21 is rotated left (counterclockwise) and the supporting member

26 of the second transportation means 22 is rotated right (clockwise). In this case, when the supporting members 26 and 26 has arrived at the position on the third transportation means 35 side (or at the second position show in FIG. 5), the bag surfaces of the bags *6a* *7a*, *6b* and *7b* that were originally facing upward now face forward with respect to the conveyance direction of the positioning conveyor 3 (or face right side in FIG. 5); and in this setting, the first and second transportation means are provided so that, for example, the swing arms 16 swing in the direction opposite from the positioning conveyor 3 after the gripping members 27 have gripped the bags, and then the swing arms 16 swing toward the positioning conveyor after the supporting member 26 of the second transportation means 21 has completed the counterclockwise rotation and the supporting member 26 of the second transportation means 22 has completed the clockwise rotation. The bags held by the gripping members 27 are, as a result, prevented from coming into contact with the swing arms 16 when the supporting members 26 are rotated.

As can be seen from the positional arrangement of the third transportation means 35 (described below), the supply conveyors, and the conveyor magazine-type bag-supply apparatuses (see FIG. 1), when bags are supplied to the packaging machine, the bag surfaces, which face forward of the bags 6*a*, 6*b*, 7*a* and 7*b* held by the second transportation means 21 and 22 (or face the feed direction of the supply conveyors 39, which will be described below) at the second position which is on the third transportation means 35 side, face outwardly (or the outer side) of the packaging machine. In cases that when it is necessary to print on bag surfaces in the packaging machine, bags are generally supplied to the packaging machine so that whichever side (front or back) of each of the bags on which printing is to be made faces the outer side of the packaging machine; and in the present invention, it is possible to print on either the front side or the back side of the bag by way of setting the rotation directions of the supporting members 26 and 26 differently as described above.

Furthermore, in the shown example, the rotation of each one of the supporting members 26 with respect to the transportation arm 24 is made by the drive mechanism 25 that includes a drive source (not shown). However, the supporting members 26 can be designed so that they are, without using drive sources, rotated at a prescribed angle when the transportation arms 24 swing; and this can be done by fixing the pulleys 31 so as not to rotate relative to the support pillars 23 and by appropriately setting the pulley ratio between the pulleys 28 and the pulleys 31. How ever, in this structure, the rotation angle and the rotation direction of the supporting member 26 with respect to the transportation arm 24 cannot be changed freely.

The third transportation means 35 is provided near the second transportation means 21 and 22.

Figure 6:
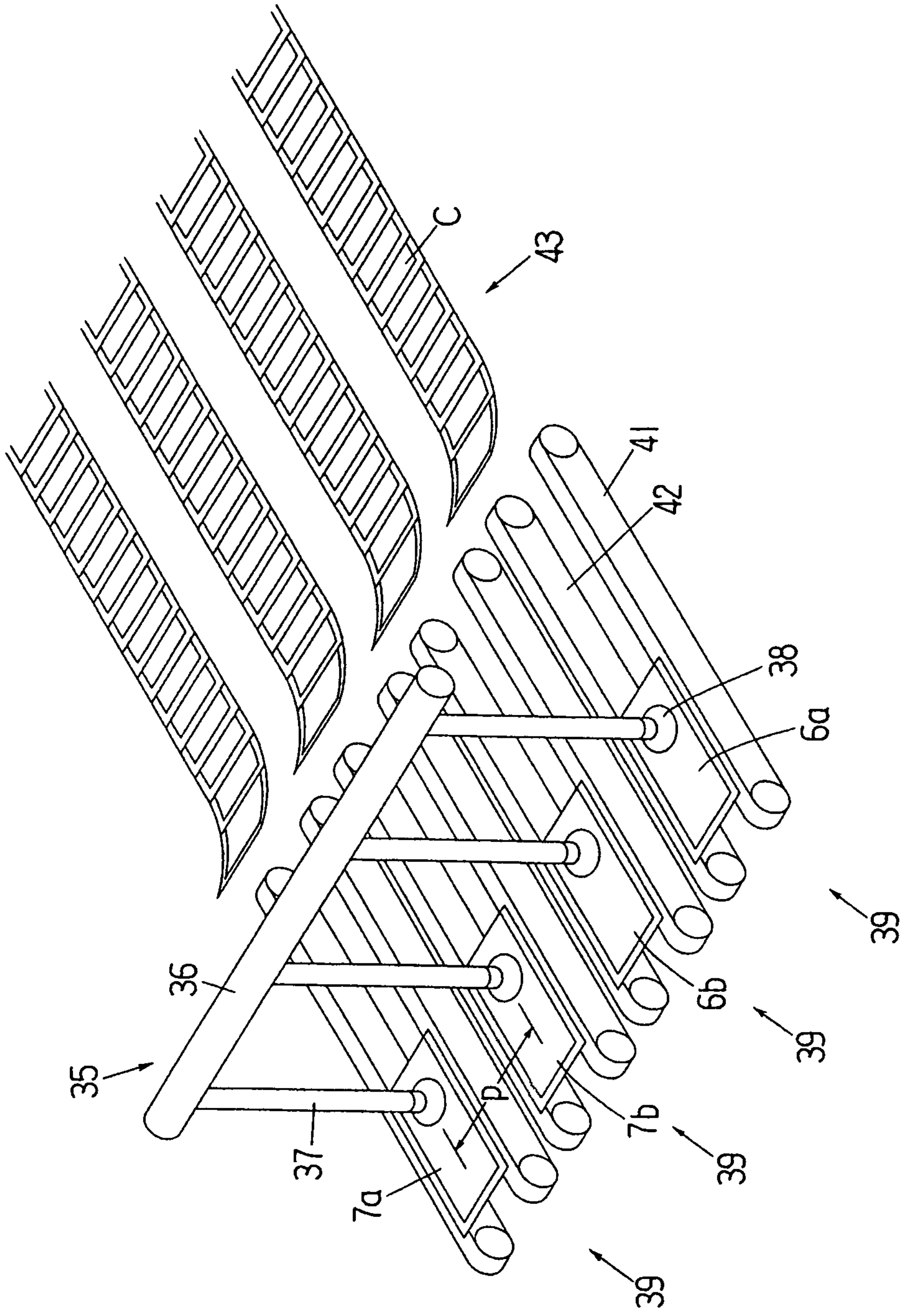
FIG. 6 is a diagram illustrating the action of the method and apparatus of the present invention, particularly showing the third transportation means with the swing arms taking the bags from the second transporting means and putting them on the supply conveyor.
Figure 7:
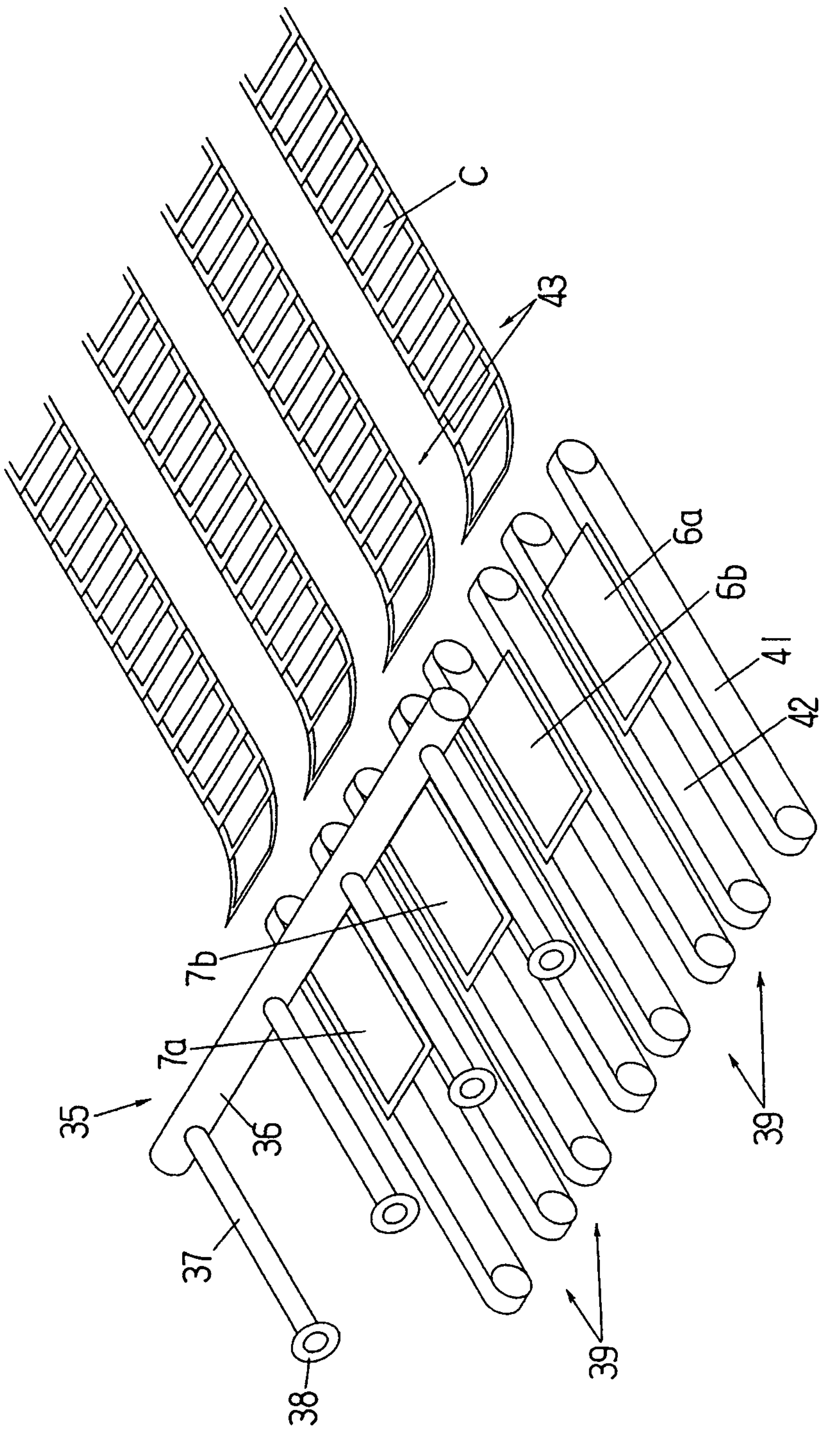
FIG. 7 is a diagram illustrating the action of the method and apparatus of the present invention, particularly showing the third transportation means with the supply conveyor conveying the bags toward belt conveyors of a conveyor magazine-type bag-supply apparatus.

The third transportation means 35, as shown in FIGS. 6 and 7, is comprised of a rotation shaft 36 disposed horizontally and at right angles with respect to the conveyance direction of the first and second conveyors 8 and 9, four swing arms 37 fixed perpendicularly to the rotation shaft 36, and suction members 38 installed at the tip ends of the swing arms 37. The suction members 38 are connected to a vacuum source or atmosphere via the tubular swing arms 37 with switching valves (not shown) in between. The rotation shaft 36 is rotated back and forth 90 degrees by a drive source (not shown); and by this rotation of the rotation shaft 36, the swing arms 37 swing up and down in a perpendicular plane parallel to the conveyance direction of the positioning conveyor 3 (or in the same direction as the conveyance direction of the supply conveyors 39) so that they take the perpendicular position shown in FIG. 6 and the horizontal position shown in FIG. 7. The space between the swing arms 37 and the space between the suction members 38 that are at the tip ends of the swing arms 37 (or the distance between the centers of the suction members 38) are respectively set to P (=$P_0$).

Figure 8:
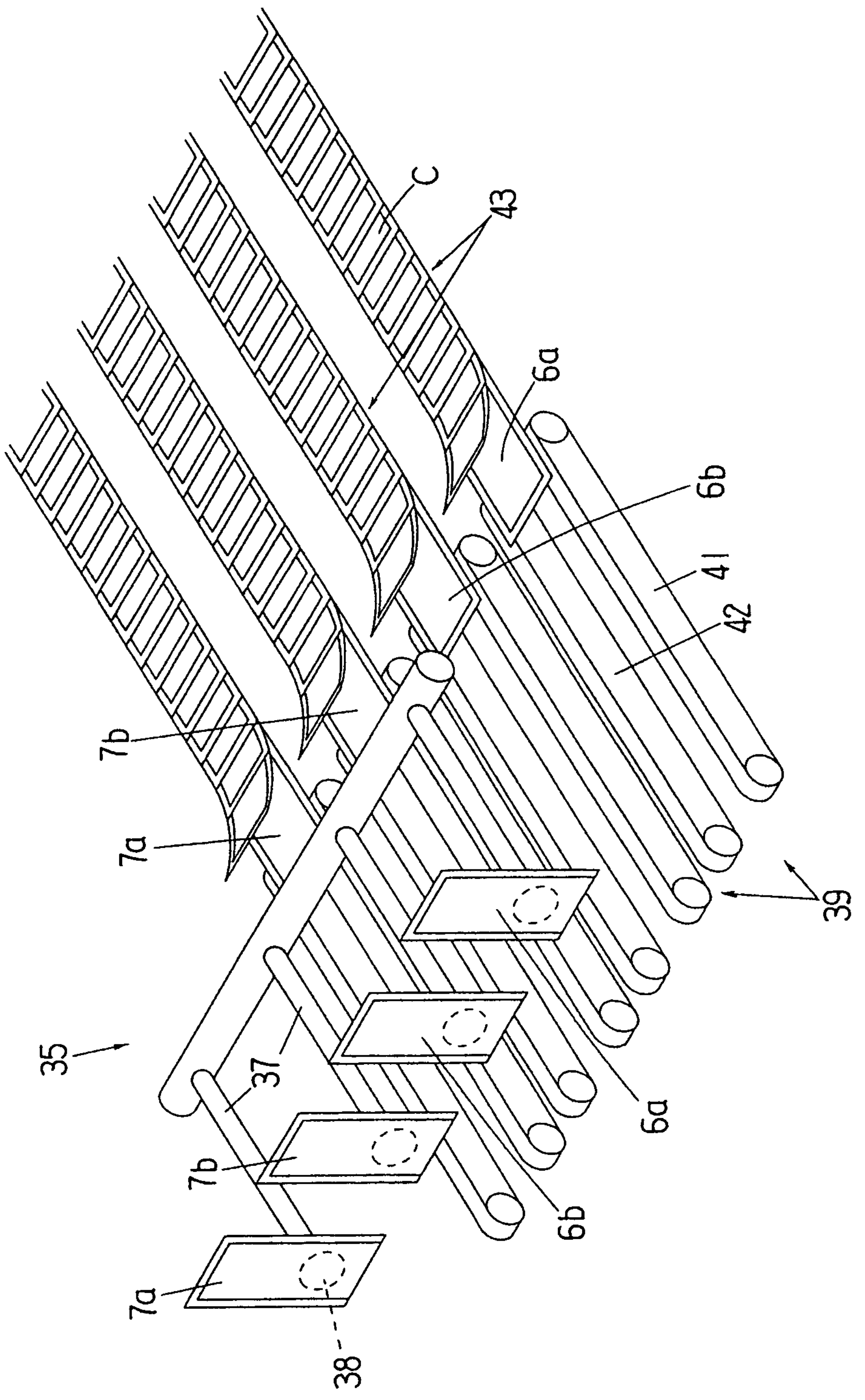
FIG. 8 is a diagram illustrating the action of the method and apparatus of the present invention, particularly showing the third transportation means with the supply conveyor conveying the bags onto the belt conveyors of the conveyor magazine-type bag-supply apparatuses.

When the swing arm 37 has swung to the horizontal position by the rotation of the rotation shaft 36, the suction surfaces of the four suction members 38 face backward as shown in FIG. 8, and the lower positions (positions close to the bag mouth portions) of the bag surfaces of the front sides of the bags 6*a*, 6*b*, 7*a* and 7*b* gripped by the gripping members 27 of the second transportation means 21 and 22 (such bag surfaces can be called bag surface facing the conveyance direction of the supply conveyors 39, or bag surface facing forward in the conveyance direction of the positioning conveyor 3) are suctioned by the suction members 38 (see FIG. 5) of the third transportation means 35. Then, when the rotation shaft 36 is rotated reversely, the swing arms 37 swing downward and forward from this position to be vertical, and as a result the bags 6*a*, 6*b*, 7*a* and 7*b* are moved downward along the perpendicular plane parallel to the conveyance direction of he positioning conveyor 3. The suction members 38 thus face downward while holding the bags 6*a*, 6*b*, 7*a* and 7*b*, and the attitude of the bags 6*a*, 6*b*, 7*a* and 7*b* are changed from the perpendicular attitude to a horizontal attitude (see FIG. 6). As a result, the bags 6*a*, 6*b*, 7*a* and 7*b* are placed on the supply conveyors 39 with all the bag mouth portions facing in the feed direction of the supply conveyors 39. When the bags 6*a*, 6*b*, 7*a* and 7*b* are thus being moved down while being suctioned by the suction members 38, the bag mouth portions face forward along an arc-shaped transport path.

As shown in FIG. 6, four sets of supply conveyors 39 corresponding to the suction members 38 of the third transportation means 35 are installed near the third transportation means 35. The conveyance direction of the four sets of supply conveyors 39 matches the direction the bag mouth portions of the bags 6*a*, 6*b*, 7*a* and 7*b*, which are held by third transportation means 35 and placed on supply conveyors 39, face.

Each of the supply conveyors 39 is comprised of a pair of conveyor belts 41 and 42 with a prescribed distance in between, and the bags 6*a*, 6*b*, 7*a* and 7*b* placed on the supply conveyors 39 are conveyed forward with their bag mouth portions facing forward (rightward in FIG. 7).

Corresponding to the four sets of supply conveyors 39, four conveyor magazine-type bag-supply apparatuses 43 which are known widely are installed. The conveyor magazine-type bag-supply apparatus 43 is not shown in the drawings, and in lieu thereof only bag groups (multiple bags) C, in which upper bags are offset sequentially in the direction of the bag mouth portions on the belt conveyor, which is a part of each conveyor magazine-type bag-supply apparatus 43, with the bag mouth portions facing forward, are shown in FIGS. 1 and 6 through 8.

As shown in FIG. 8, the bag at the rear end of each bag group C is lifted up by an arm (not shown) in synchronous with the bag being fed from the supply conveyors 39 (see Japanese Patent Application Laid-Open (Kokai) No. 8-337217), and each of the bags 6*a*, 6*b*, 7*a* and 7*b* on the supply conveyors 39 is fed into the space between the belt conveyors of the conveyor magazine-type bag-supply apparatuses 43 and the above-described rear-end bag.

Next, the overall operation of the bag supply apparatus described above will be described below with reference to FIGS. 2 through 8.

(1) As shown in FIG. 2, two rows of connected bags 6 and 7 are created from a belt-like film in the horizontal-type bag-making machine 1, and the leading bag is sequentially cut off. Bags 6*a*, 7*a*, 6*b* and 7*b* cut out of the connected bags 6 and 7 are fed out from the horizontal-type bag-making machine 1 onto the positioning conveyor 3 and conveyed by the positioning conveyor 3 (that comprises the first and second conveyors 8 and 9), so that they are positioned at prescribed locations on the positioning conveyor 3 (or on the small conveyors (sub-conveyors) 8 and 9). Then, the first transportation means 4 and 5 are operated, and the portions of the closed side of the positioned bags 6*a*, 7*a*, 6*b* and 7*b* are suctioned by the suction members 17.

(2) Then, the swing arms 16, as shown in FIG. 3, of the first transportation means 4 and 5 swing upward, and thus the bags 6*a*, 6*b*, 7*a* and 7*b* suctioned by the suction members 17 are moved upward, so that their horizontal attitude on the positioning conveyor 3 is changed to a vertical attitude in which the bag mouth portions face downward.

(3) Next, as shown in FIG. 4, the transportation arms 24 of the second transportation means 21 and 22 swing to the first positions which are on the first transportation means 4 and 5 side, and the bag gripping members 27 are closed, thus gripping the top edges of the bags 6*a*, 6*b*, 7*a* and 7*b* with the bag mouth portions facing downward. The suction of the suction members 17 of the first transportation means 4 and 5 is stopped, releasing the bags 6*a*, 6*b*, 7*a* and 7*b*, and the bags 6*a*, 6*b*, 7*a* and 7*b* are transferred to the second transportation means 21 and 22 by being gripped by the bag gripping members 27. At this time, the next bags from the horizontal-type bag-making machine 1 (these bags are also labeled 6*a*, 6*b*, 7*a* and 7*b*) have been already fed onto the positioning conveyor 3.

(4) As shown in FIG. 5, the transportation arms 24 of the second transportation means 21 and 22 swing horizontally, and the bags 6*a*, 6*b*, 7*a* and 7*b* held by the second transportation means 21 and 22 are transported horizontally to a prescribed or second position (or to the transfer position where the bag transportation to the third transportation means 35 is made) while maintaining their vertical attitude, and, while thus being transported, the bags are rotated within the horizontal plane, changing their orientation 90 degrees. At this time, one bag surface of each one of the bags 6*a*, 6*b*, 7*a* and 7*b* faces the feed direction of the supply conveyors 39, and the suction members 38 of the third transportation means 35 are already waiting at the above-described prescribed or second position (where the swing arms 37 are in the horizontal position). The lower positions of the bag surfaces of the front sides (downstream sides) of the bags 6*a*, 6*b*, 7*a* and 7*b* which are held in perpendicular attitude by the second transportation means 21 and 22 (the bag surfaces facing the feed direction of the supply conveyors 39) are next suctioned by the suction members 38, which are facing rearward, of the swing arms 37. Next, the gripping members 27 of the second transportation means 21 and 22 are opened, releasing the bags 6*a*, 6*b*, 7*a* and 7*b*, so that the bags 6*a*, 6*b*, 7*a* and 7*b* are thus transferred to the third transportation means 35 by being suction-held by the suction members 38. At this time, the first transportation means 4 and 5 have been are already operated, and the next four bags positioned on the positioning conveyor 3 are suctioned by the suction members 17 of the second transportation means 21 and 22.

(5) As shown in FIG. 6, the swing arms 37 of the third transportation means 35 swing to take the perpendicular position, thus changing the bags 6*a*, 6*b*, 7*a* and 7*b* from the perpendicular attitude with the bag mouth portions facing downward to the horizontal attitude, and then the swing arms 37 place the bags on the supply conveyors 39 so that the bag mouth portions of the bags face forward (or face in the feed direction of the supply conveyors 39). Then, the suction of the suction members 38 of the swing arms 37 stops, releasing the bags 6*a*, 6*b*, 7*a* and 7*b* on the supply conveyors 39.

(6) As shown in FIG. 7, the bags 6*a*, 6*b*, 7*a* and 7*b* with the bag mouth portions facing forward on the supply conveyors 39 are conveyed toward the belt conveyors of the conveyor magazine-type bag-supply apparatuses 43 by the supply conveyors 39.

(7) As shown in FIG. 8, the bags 6*a*, 6*b*, 7*a* and 7*b* with the bag mouth portions facing forward are supplied from the supply conveyors 39 to the belt conveyors of conveyor magazine-type bag-supply apparatuses 43.

In the above-described example, the horizontal-type bag-making machine is a two-row type, the orientation of the bags manufactured and fed out therefrom is different by 90 degrees from the orientation of the bags in the conveyor magazine-type bag-supply apparatuses, the orientation of the bags fed out in two rows in parallel are different by 180 degrees, and the number of the belt conveyors of the conveyor magazine-type bag-supply apparatuses are four (four bags are transported at once). However, the present invention, needless to say, can be generally applied to other combinations of horizontal-type bag-making machines and packaging machines.

Another example of the method and apparatus for supplying bags to a packaging machine according to the present invention will be described in detail below with reference to FIG. 9. In the bag supply apparatus of FIG. 9, parts equivalent to the supply apparatus shown in FIG. 1 have the same reference numerals.

Figure 9:
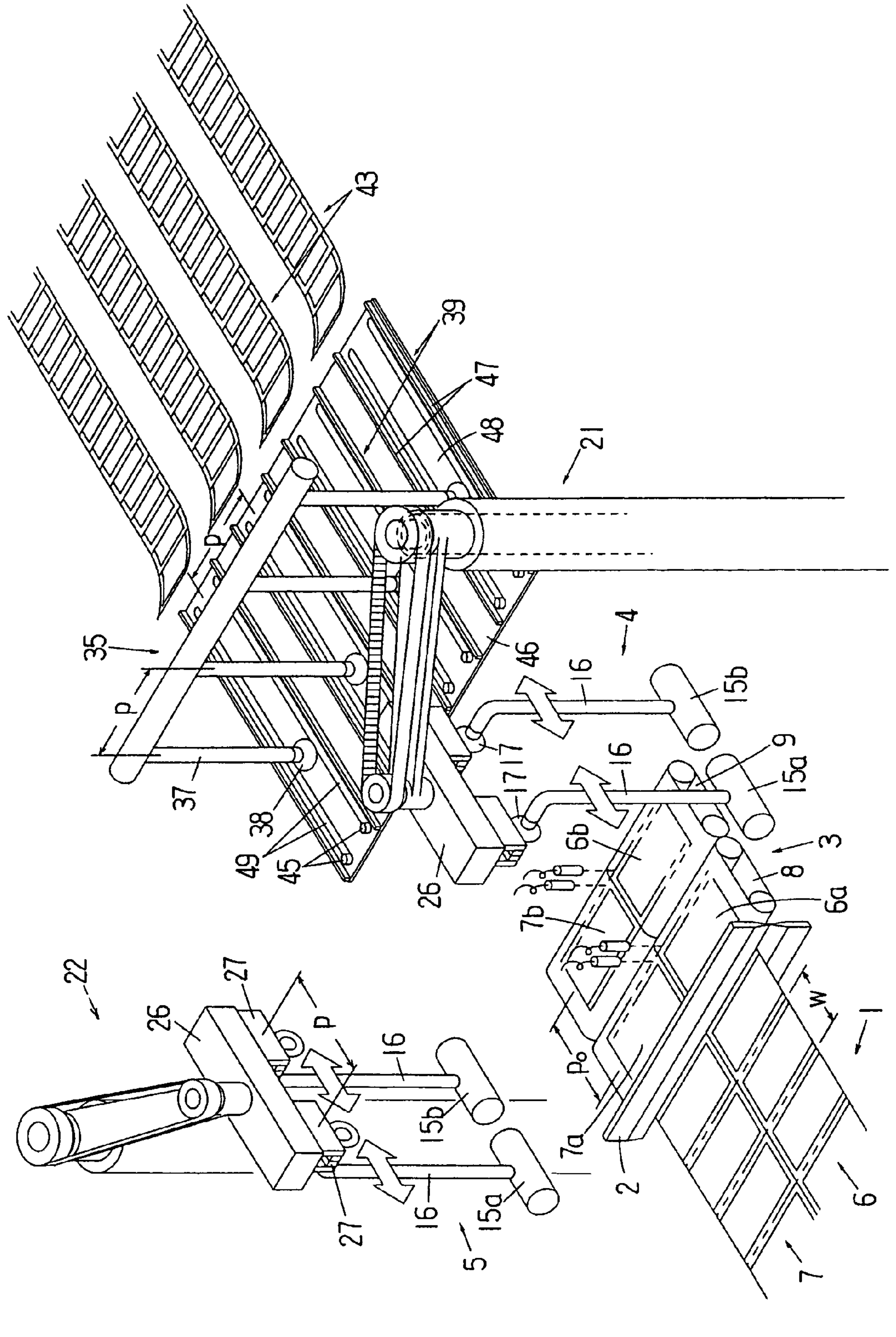
FIG. 9 is an overall perspective view of another bag transfer apparatus according to the present invention.

The following primarily describes areas where the bag supply apparatus of FIG. 9 differs from the bag supply apparatus of FIG. 1.

The first difference is that the conveyance distance of the small conveyors 8 and 9 (or the length in the conveyance direction of the small conveyors 8 and 9), which make the positioning conveyor 3, are shorter than in the apparatus shown in FIG. 1, and the space of the bags between the row of the bags 6*a* and 6*b* positioned on the small conveyors 8 and 9 (or the space between the bags 7*a* and 7*b*) $P_0$ is set to be greater (wider) than the bag width W ($P_0>W$) but smaller (narrower) than the space P of the supply conveyors 39 ($P_0<P$) that are provided in parallel.

In this setting, the space between the suction members 17 and 17 of the first transportation means 4 and 5 is set so as to be variable between $P_0$ and P. More specifically, the swing arms 16 and 16 of the first transportation means 4 and 5 are provided on different rotation shafts 15*a* and 15*b*, and the rotation shafts 15*a* and 15*b* are movable back and forth in opposite directions to each other in their axial direction as the rotation shafts 15*a* and 15*b* are rotated by a mechanism which is not shown in FIG. 9. As a result, the swing arms 16 and 16 swing between the perpendicular position and the horizontal position and, at the same time, move closer to and away from each other, and the suction members 17 and 17 at the tip ends of the swing arms 16 are also moved closer to and away from each other. More specifically, before the swing arms 16 and 16 swing down to the horizontal position, they are brought to be closer to each other, and the space between suction members 17 and 17 becomes $P_0$; when the swing arms 16 and 16 swing upward to the perpendicular position, the swing arms 16 and 16 are moved away from each other and the space between suction members 17 and 17 becomes P. The space between bag gripping members 27 of the second transportation means 21 and 22 and the space between the suction members 38 of the third transportation means 35 are fixed to P and not variable.

The operation of the above-described positioning conveyor 3 and first transportation means 4 and 5 is as follows:

(1) The bags 6*a*, 6*b*, 7*a* and 7*b* fed out from the horizontal-type bag-making machine 1 onto the positioning conveyor 3 are conveyed by the positioning conveyor 3 (or by the first and second conveyors (sub-conveyors) 8 and 9) and positioned at prescribed locations on the positioning conveyor 3 (or on the small conveyors (sub-conveyors) 8 and 9). At this time, the space between the bags 6*a* and 6*b* and the space between the bags 7*a* and 7*b* in each row is $P_0$ ($P_0$<P).

(2) Then, the swing arms 16 and 16 of the first transportation means 4 and 5 swing to the horizontal position, and the suction members 17 and 17, which are at the tip ends of the swing arms 16 and 16 and are separated at space $P_0$, suction the bags 6*a*, 6*b*, 7*a* and 7*b* on the conveyor 3. The swing arms 16 and 16 then swing to the perpendicular position, and, during this swing motion, the space between the suction members 17 and 17 becomes P; and as a result, the space between the bags 6*a* and 6*b* and the space between bags 7*a* and 7*b* which are suctioned by the suction members 17 and 17 also becomes P.

(3) The process after this is the same as that of the supply apparatus shown in FIG. 1. The space between the suction members 17 and 17, indeed, becomes to $P_0$ as the swing arms 16 and 16 of the first transportation means 4 and 5 swing back to the horizontal position.

When the positioning conveyor 3 and the first transportation means 4 and 5 as described above and as shown in FIG. 9 are employed, the conveyance distance of the bags 6*a*, 6*b*, 7*a* and 7*b* on the small conveyors 8 and 9 that make the positioning conveyor 3 can be shorten, and the time for positioning the bags 6*a*, 6*b*, 7*a* and 7*b* can be shorten as well; and thus it is possible to increase the bag supply speed.

In the above-described structure, the space between the suction members 17 and 17 of the first transportation means 4 and 5 is made to widen when the suction members 17 are brought to the perpendicular position. However, all it is required in this setting is that the bags 6*a*, 6*b*, 7*a* and 7*b* positioned at space distance $P_0$ are transported to the supply conveyors 39 at ultimate space P; accordingly, it is also possible that the space distance between the bag gripping members 27 of the second transportation means 21 and 22 or the space distance between the suction members 38 of the third transportation means 35 is made to widen; and further, more than one of the spaces comprising the space between the suction members 17 and 17 of the first transportation means 4 and 5, the space between the bag gripping members 27 and 27 of the second transportation means 21 and 22, and the space between the four suction members 38 of the third transportation means 35 can be made to widen during the bag transportation.

The second difference of the bag supply apparatus of FIG. 9 from the bag supply apparatus of FIG. 1 is that the supply conveyors 39 of the bag supply apparatus of FIG. 9 use conveyance mechanisms that include a pair of feed pins 45.

More specifically, as seen from FIG. 9, each supply conveyor 39 is provided with a flat frame 46 (commonly used for all supply conveyors 39) installed on a machine base (not shown), a pair of feed pins 45, a pair of guide plates 47 fixed to the frame 46 that guide bags at two edges thereof, an elevator mechanism (not shown) that raises and lowers the feed pins 45, and a moving mechanism (not shown) that moves the feed pins 45 forward and backward. The top surface of a part (a bag support plate 48) that is between the pair of (or two) guide plates 47 on the flat frame 46 makes the bag conveyance surface. A pair of groove openings 49 are formed on the left and right sides of each bag support plate 48 so that the feed pins 45 are projected out therefrom and moved forward and backward in the groove openings 49.

In this structure, when the bags 6*a*, 6*b*, 7*a* and 7*b* are placed on the supply conveyors 39 by the third transportation means 35, and the suction members 38 release the bags 6*a*, 6*b*, 7*a* and 7*b*, the feed pins 45 are elevated by the elevator mechanism and project out, through the groove openings 49, of the conveyance surfaces of the bag support plates 48. The position where the pair of feed pins 45 project out is behind each one of the bags 6*a*, 6*b*, 7*a* and 7*b* that are placed on bag support base 48. N ext, the moving mechanism advances (or moves rightward) the feed pins 45, bringing the feed pins into contact with the rear end of each of the bags 6*a*, 6*b*, 7*a* and 7*b* on the bag support base 48, and then the bags 6*a*, 6*b*, 7*a* and 7*b* are conveyed toward the belt conveyors of the conveyor magazine-type bag-supply apparatuses 43. After this conveyance, the elevator mechanism lowers the feed pins 45 below the conveyance surface of the bag support plate 48 and the moving mechanism returns the feed pins 45 to their original positions.

The invention claimed is:

1. A method of supplying bags toward a belt conveyor of a conveyor magazine-type bag-supply apparatus of a packaging machine comprising the steps of:

creating, in a horizontal-type bag-making machine, connected empty bags joined in belt-like fashion as a belt-like film is fed sequentially in a longitudinal direction of the belt-like film and then cutting off individual bags from the connected empty bags, placing empty bags fed out from the horizontal-type bag-making machine onto a positioning conveyor and conveying the empty bags while positioning the empty bags at a prescribed position on the positioning conveyor, moving the positioned empty bags upward, changing the empty bags into a vertical attitude in which bag mouth portions of the empty bags face downward, transporting the empty bags horizontally toward a predetermined location, while maintaining the vertical attitude thereof, and rotating the empty bags within a horizontal plane so that a bag surface orientation of the empty bags is changed 90 degrees, then changing the vertically-oriented empty bags to a horizontal attitude, and placing the empty bags on a supply conveyor, and conveying and supplying the empty bags horizontally on the supply conveyor toward the belt conveyor of the packaging machine.

2. The method of supplying bags to a packaging machine according to claim 1, wherein the positioning of the empty bags is made for a plurality of empty bags on the positioning conveyor at a space distance of $P_0$ in a conveyance direction of the positioning conveyor, and when a plurality of supply conveyors are provided in parallel at a space distance of P that is greater than the space distance $P_0$, increasing the space between bags from $P_0$ to P in any one or a plurality processes from a process that moves the empty bags positioned on the positioning conveyor upward to a process that places the empty bags on the supply conveyors.

3. The method of supplying bags to a packaging machine according to claim 2, wherein the space between bags is increased from $P_0$ to P during a process of moving the empty bags that are positioned on the positioning conveyor upward.

* * * * *